US012370705B2

(12) United States Patent
Bushman et al.

(10) Patent No.: US 12,370,705 B2
(45) Date of Patent: Jul. 29, 2025

(54) HAIR CLIPPER BLADESET WITH VARIABLE RAKE ANGLE ARRAY TOOTH GEOMETRY

(71) Applicant: WAHL CLIPPER CORPORATION, Sterling, IL (US)

(72) Inventors: Christine Bushman, Sterling, IL (US); Michael Holmes, Sterling, IL (US)

(73) Assignee: WAHL CLIPPER CORPORATION, Sterling, IL (US)

( * ) Notice: Subject to any disclaimer, the term of this patent is extended or adjusted under 35 U.S.C. 154(b) by 425 days.

(21) Appl. No.: 17/931,421

(22) Filed: Sep. 12, 2022

(65) Prior Publication Data

US 2023/0090687 A1 Mar. 23, 2023

Related U.S. Application Data

(60) Provisional application No. 63/261,181, filed on Sep. 14, 2021.

(51) Int. Cl.
*B26B 19/38* (2006.01)
*B26B 19/06* (2006.01)

(52) U.S. Cl.
CPC .......... *B26B 19/3846* (2013.01); *B26B 19/06* (2013.01)

(58) Field of Classification Search
CPC ...... B27B 11/00; B26B 19/02; B26B 19/3846
USPC .................................................. 30/194, 208
See application file for complete search history.

(56) References Cited

U.S. PATENT DOCUMENTS 4,152,830 A 5/1979 Meijer et al.
5,473,818 A * 12/1995 Otsuka .................. B26B 19/384 30/43.7
5,579,581 A * 12/1996 Melton ............... B26B 19/3813 30/223

(Continued)

FOREIGN PATENT DOCUMENTS

DE 102009035232 A1 2/2011
EP 2926959 A1 7/2015

(Continued)

OTHER PUBLICATIONS

International Search Report and Written Opinion received for PCT/US2022/042363, dated Jan. 4, 2023.

*Primary Examiner* — Adam J Eiseman
*Assistant Examiner* — Deborah Lin
(74) *Attorney, Agent, or Firm* — Greer, Burns & Crain, Ltd

(57) ABSTRACT

A bladeset for a hair clipper has a stationary blade with a plurality of stationary blade teeth defined along a stationary blade lateral axis and includes first and second outermost stationary blade teeth. A stationary blade midpoint is defined between the first and second outermost stationary blade teeth. The bladeset also has a moving blade with a plurality of moving blade teeth defined along a moving blade lateral axis and includes first and second outermost moving blade teeth. A moving blade midpoint is defined between the first and second outermost moving blade teeth. Preferably, each of the stationary blade teeth and the moving blade teeth define a rake angle along at least one edge of each tooth, and the rake angles of at least one of the stationary blade teeth and the moving blade teeth change gradually from the corresponding blade midpoint to the corresponding outermost tooth.

19 Claims, 8 Drawing Sheets

(56) References Cited

U.S. PATENT DOCUMENTS

| | | | | |
|---|---|---|---|---|
| 5,964,037 | A * | 10/1999 | Clark | B26B 19/20 30/223 |
| 6,073,350 | A | 6/2000 | Elston et al. | |
| 6,658,740 | B2 | 12/2003 | Habben | |
| 6,684,511 | B2 | 2/2004 | McCambridge et al. | |
| 6,973,855 | B2 | 12/2005 | Yanosaka et al. | |
| 7,080,458 | B2 | 7/2006 | Andis | |
| 7,841,091 | B2 | 11/2010 | Melton | |
| 8,713,802 | B2 | 5/2014 | Fukutani et al. | |
| 9,027,252 | B2 | 5/2015 | Moseman | |
| 2007/0214654 | A1 | 9/2007 | Chen et al. | |
| 2012/0240415 | A1 | 9/2012 | Tringali et al. | |
| 2014/0115901 | A1* | 5/2014 | Liao | B26B 19/3846 30/208 |
| 2014/0311306 | A1 | 10/2014 | Sablatschan | |
| 2016/0101530 | A1 | 4/2016 | Sablatschan et al. | |
| 2016/0229070 | A1 | 8/2016 | Yao | |
| 2017/0015010 | A1 | 1/2017 | Krause | |
| 2017/0355088 | A1 | 12/2017 | Kim | |
| 2020/0055205 | A1 | 2/2020 | Werner et al. | |

FOREIGN PATENT DOCUMENTS

| | | | | |
|---|---|---|---|---|
| EP | 3388208 | A1 | 10/2018 | |
| EP | 2939802 | B1 | 7/2019 | |
| EP | 3854540 | A1 * | 7/2021 | B26B 19/042 |
| FR | 2411677 | A1 | 7/1979 | |
| GB | 2435845 | A | 9/2007 | |
| JP | 3138747 | U | 1/2008 | |
| WO | 2018109093 | A1 | 6/2018 | |

* cited by examiner

HAIR CLIPPER BLADESET WITH VARIABLE RAKE ANGLE ARRAY TOOTH GEOMETRY

RELATED APPLICATION

The present application claims the benefit under 35 U.S.C. 119 (e) of U.S. Provisional Application No. 63/261,181 filed Sep. 14, 2021, the entire contents of which are incorporated by reference herein.

BACKGROUND

The present disclosure relates generally to electric hair clippers and hair trimmers, and more specifically to bladesets for such devices. In particular, the present disclosure relates to bladesets with improved cutting action at outer edges of the bladeset. Electric hair trimmers or clippers, collectively referred to here as clippers, are commonly used by stylists, barbers, animal groomers or individuals for styling hair, and typically include a handle having a housing for enclosing a motor and a blade assembly associated with the handle. The blade assembly is generally fixed to the handle at a certain orientation for receiving driving power from the motor.

A bladeset in the blade assembly includes a stationary blade and a moving blade reciprocating laterally and substantially parallel relative to the stationary blade to provide a scissors-type cutting action by way of the relative movement of teeth positioned along an edge of each of the moving and stationary blades. For the moving blade and the stationary blade to effectively reciprocate with respect to one another, and thereby cut hair effectively, enough force must be applied to the moving blade to ensure good surface contact with the stationary blade during reciprocation. This force is typically referred to as blade tension. Inadequate blade tension can lead to poor cutting performance.

Traditionally, the moving blade is pressed against the stationary blade by springs or other mechanical means which exert force upon the moving blade to achieve this blade tension. Often, a single spring is used to press the moving blade against the stationary blade. In these instances, the single spring is usually located in the middle of the moving blade, and may be located a distance away from the teeth of the moving and stationary blades. As a result, the tension force between the moving blade and the stationary blade is greatest at the location of the spring, and decreases proportionately with the distance from the location of the spring. Put differently, the spring does not apply a uniform blade tension across the row of teeth of the moving blade.

Accordingly, the reduced tension between the blades in many cases results in a less effective cutting action at the outer edges of the bladeset. However, while stronger springs have been considered to address this problem, there is a maximum amount of tension that can exist between the stationary blade and the moving blade while still allowing effective blade reciprocation. Also, increasing the force of the spring increases unwanted operational temperature that is uncomfortable to both the user and the subject of the hair cutting, and has not shown to be a solution to the problem of poor cutting performance on edges of the bladeset.

Therefore, there is a need for a bladeset that includes a stationary blade and a moving blade that are able to account for the reduced tension between the blades at the locations farthest away from where the force is applied to the moving blade.

SUMMARY

The above-listed need is met or exceeded by the present bladeset and accompanying hair clipper. A feature of the present bladeset is the variable rake angle array tooth geometry present on at least one of the blades in the bladeset. In particular, the present bladeset includes both a stationary blade and a moving blade which reciprocates with respect to the stationary blade. Each of the stationary blade and the moving blade include a plurality of teeth that are arranged in a parallel configuration to form respective arrays of teeth. An important feature of the present disclosure is the fact that the array of teeth for at least one of the moving blade and the stationary blade have variable rake angles. The rake angle for the moving and stationary blade teeth is the angle between a vertical line perpendicular to the axis of reciprocation of the moving glade, and the edge of the blade tooth. The sharpness of a blade tooth is determined by the rake angle, where a greater rake angle results in a sharper blade tooth.

As discussed above, a common problem with traditional hair clippers is the fact that there is a lack of tension between the stationary and moving blades at the locations farthest away from the site where force is applied to the moving blade. In other words, the tension between the moving blade and the stationary blade is least for the outermost teeth. Through experimentation by the inventors, it has been determined that increasing the rake angle for the outermost teeth of the plurality of stationary blade teeth and moving blade teeth aids in resolving the issue related to a lack of tension between the moving blade and stationary blade. Specifically, a greater rake angle provides a sharper cutting edge, thereby counteracting the loss resulting from a lack of tension between the outermost teeth. In other words, the present bladeset has teeth in at least one of the moving and stationary blades that are sharper as one moves from a center of the tooth array and moving towards respective outer edges of the bladeset.

More specifically, a bladeset for a hair clipper is provided and includes a stationary blade having a stationary blade body from which project a plurality of stationary blade teeth defined along a stationary blade lateral axis. The plurality of stationary blade teeth include first and second outermost stationary blade teeth and a stationary blade midpoint being defined between the first and second outermost stationary blade teeth. Additionally, the bladeset includes a moving blade having a moving blade body from which project a plurality of moving blade teeth defined along a moving blade lateral axis. Further, the plurality of moving blade teeth including first and second outermost moving blade teeth and a moving blade midpoint is defined between the first and second outermost moving blade teeth. Moreover, each of the stationary blade teeth and the moving blade teeth define a rake angle along at least one edge of each tooth, and the rake angles of at least one of the stationary blade teeth and the moving blade teeth change gradually from the corresponding blade midpoint to the corresponding outermost tooth.

In an embodiment, the rake angles of at least one of the stationary blade teeth and the moving blade teeth gradually increase from the corresponding blade midpoint to the corresponding outermost tooth. Alternatively, the rake angles of both of the stationary blade teeth and the moving blade teeth gradually increase from the corresponding blade midpoint to the corresponding outermost tooth. For either of the preceding embodiments, the rake angles range between 0-30 degrees.

In another embodiment, each of the stationary blade teeth and the moving blade teeth define a second rake angle along a second edge of each tooth, and the second rake angles of at least one of the stationary blade teeth and the moving blade teeth change gradually from the corresponding blade midpoint to the corresponding outermost tooth. Preferably, the second rake angles of at least one of the stationary blade teeth and the moving blade teeth gradually decrease from the corresponding blade midpoint to the corresponding outermost tooth.

In yet another embodiment, each of the stationary blade teeth and the moving blade teeth define a second rake angle along a second edge of each tooth, and the second rake angles of at least one of the stationary blade teeth and the moving blade teeth remain constant from the corresponding blade midpoint to the corresponding outermost tooth. A second embodiment of the present disclosure is bladeset for a hair clipper which includes a stationary blade having a stationary blade body from which project a plurality of stationary blade teeth defined along a stationary blade lateral axis. The plurality of stationary blade teeth includes first and second outermost stationary blade teeth, and the stationary blade lateral axis includes a blade midpoint located between the outermost stationary blade teeth. Further, the stationary blade teeth each include an interior edge having an interior rake angle, the stationary blade teeth interior rake angle changing gradually between the blade midpoint and the outermost stationary blade teeth.

Additionally, the second embodiment includes a moving blade having a moving blade body from which project a plurality of moving blade teeth defined along a moving blade lateral axis and being configured for laterally reciprocating relative to the stationary blade for cutting hair therebetween. Moreover, the plurality of moving blade teeth includes first and second outermost moving blade teeth, and the moving blade lateral axis includes a blade midpoint located between the outermost moving blade teeth. Also, the moving blade teeth including an interior edge having an interior rake angle, the moving blade teeth interior rake angles changing gradually between the blade midpoint and the outermost stationary blade teeth.

In preferred embodiments, the stationary blade teeth interior rake angles and moving blade teeth interior rake angles gradually increase between the blade midpoint and the corresponding outermost blade tooth. Preferably, the stationary blade teeth interior rake angle and the moving blade teeth interior rake angles range between 0-30 degrees.

In an alternate embodiment, each of the stationary blade teeth and the moving blade teeth define an exterior rake angle along an exterior edge opposite the interior edge, and the exterior rake angles of at least one of the stationary blade teeth and the moving blade teeth change gradually from the corresponding blade midpoint to the corresponding outermost tooth. Preferably, the exterior rake angles of at least one of the stationary blade teeth and the moving blade teeth gradually decrease from the corresponding blade midpoint to the corresponding outermost tooth.

In yet another embodiment, each of the stationary blade teeth and the moving blade teeth define an exterior rake angle along an exterior edge opposite the interior edge, and the exterior rake angles of at least one of the stationary blade teeth and the moving blade teeth remain constant from the corresponding blade midpoint to the corresponding outermost tooth.

A third embodiment of the present disclosure is a hair clipper which includes a base structural housing with a bladeset operably secured thereto. The bladeset has a stationary blade having a stationary blade body from which project a plurality of stationary blade teeth defined along a stationary blade lateral axis. Moreover, the plurality of stationary blade teeth includes first and second outermost stationary blade teeth and a stationary blade midpoint being defined between the first and second outermost stationary blade teeth. Additionally, the bladeset includes a moving blade having a moving blade body from which project a plurality of moving blade teeth defined along a moving blade lateral axis. Further, the plurality of moving blade teeth including first and second outermost moving blade teeth and a moving blade midpoint being defined between the first and second outermost moving blade teeth. Each of the stationary blade teeth and the moving blade teeth define a rake angle along at least one edge of each tooth, and the rake angles of at least one of the stationary blade teeth and the moving blade teeth change gradually from the corresponding blade midpoint to the corresponding outermost tooth.

DETAILED DESCRIPTION

Figure 1:
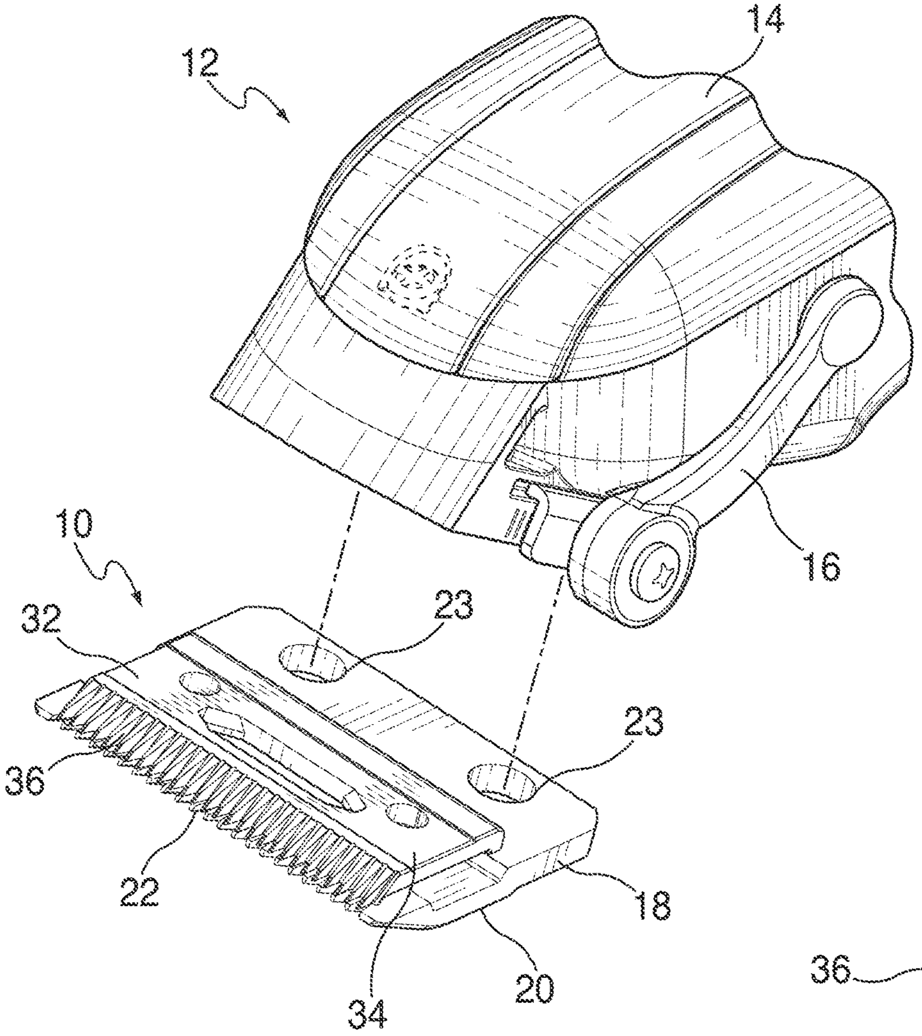
FIG. 1 is an exploded fragmentary perspective view of a hair clipper which includes the present bladeset with variable rake angle array tooth geometry.

Referring now to FIGS. 1-5, the present bladeset is generally designated 10, and is shown in conjunction with a hair clipper 12. It will be recognized from the disclosure herein that the form factor of the hair clipper 12 shown is non-limiting and exemplary only. Indeed, it is contemplated herein that the bladeset 10 may be applied to any hair clipper device that is operable to reciprocate a moving blade relative to a stationary blade. The bladeset 10 is operably secured to a housing 14 of the hair clipper 12. The housing 14 is typically provided in two halves. Preferably, the bladeset 10 is secured to the housing 14 by use of mechanical fasteners or other related fasteners. Also optionally included is a taper lever 16 used for adjusting how close to the skin the bladeset 10 cuts hair. Additionally, the bladeset 10 includes a stationary blade 18 with a stationary body 20, from which project a plurality of stationary blade teeth 22. Moreover, the stationary blade body includes stationary blade holes 23 which are designed to receive the fasteners for releasably securing the bladeset to the housing 14.

Figure 5:
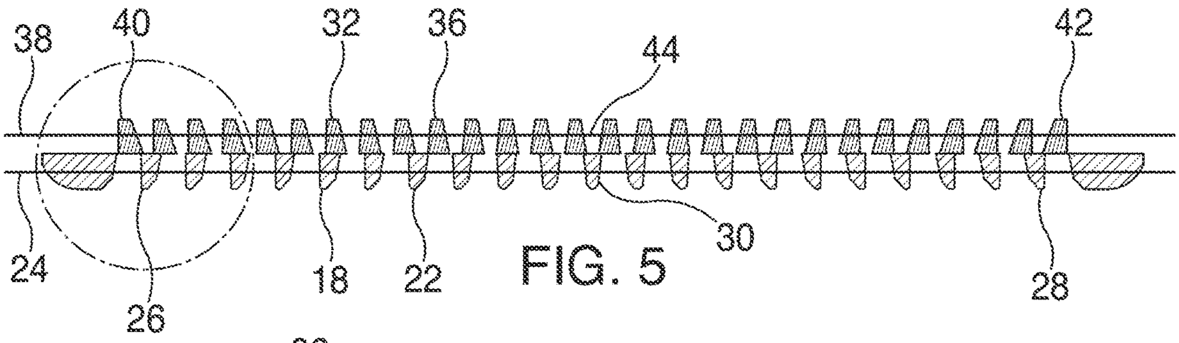
FIG. 5 is a cross-section taken along the line 5-5 of FIG. 3 and in the direction generally indicated.

Referring now to FIG. 5, the plurality of stationary blade teeth 22 is defined in parallel spaced relationship along a stationary blade lateral axis 24. Among the plurality of stationary blade teeth 22 are a first outermost stationary blade tooth 26, and a second outermost stationary blade tooth 28. The first and second outermost stationary blade teeth 26, 28 are on opposing ends of the plurality of stationary blade teeth 22. In between the first and second outermost stationary teeth 26, 28 is a stationary blade midpoint 30. It is preferred that the stationary blade midpoint 30 is at the center of the plurality of stationary blade teeth 22.

Figure 2:
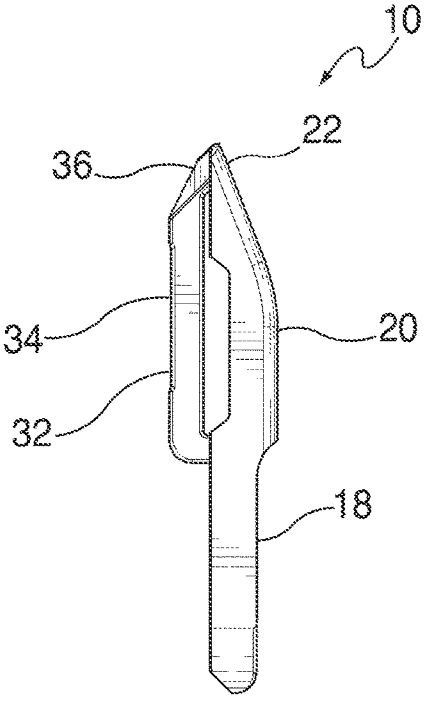
FIG. 2 is a side elevation view of the bladeset of FIG. 1.
Figure 3:
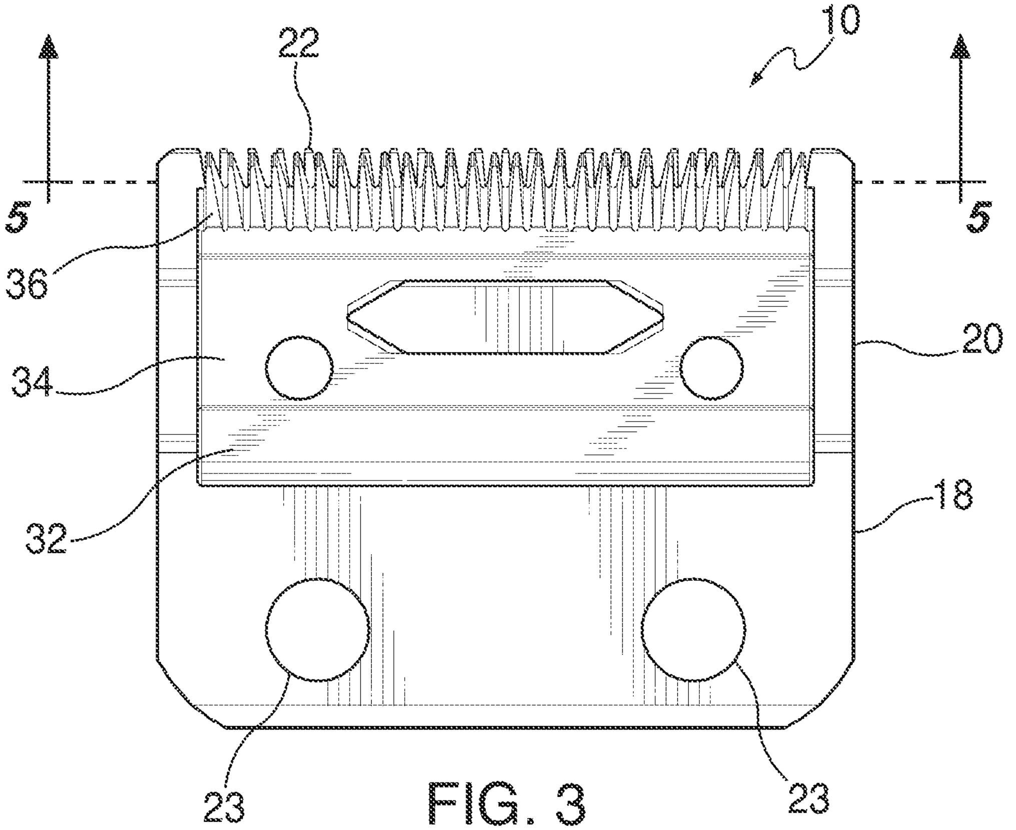
FIG. 3 is a top plan view of the bladeset of FIG. 1.
Figure 4:
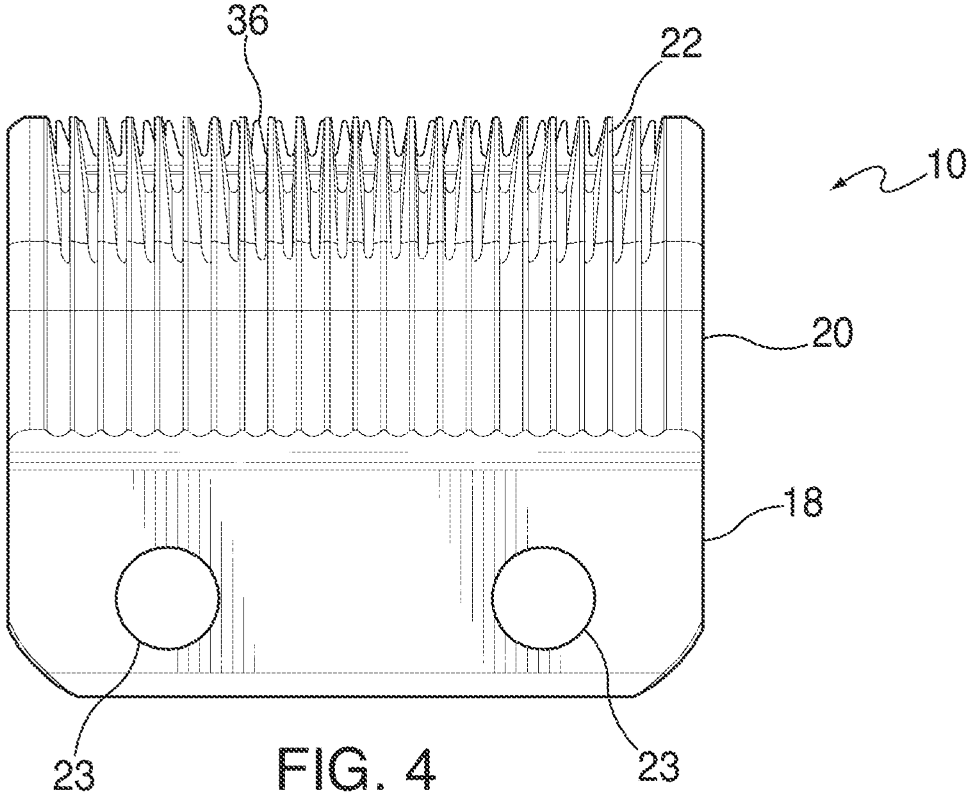
FIG. 4 is a bottom plan view of the bladeset of FIG. 1.

Referring again to FIGS. 1-5, similarly, the bladeset 10 includes a moving blade 32 which includes a moving blade body 34 from which project a plurality of moving blade teeth 36. The plurality of moving blade teeth 36 are defined in parallel spaced relationship along a moving blade lateral axis 38 (FIG. 5). Among the plurality of moving blade teeth 36 are a first outermost moving blade tooth 40 and a second outermost moving blade tooth 42. The first and second outermost moving blade teeth 40, 42 are on opposing ends of the plurality of moving blade teeth 36. In between the first and second outermost moving blade teeth 40, 42 is a moving blade midpoint 44. It is preferred that the moving blade midpoint 44 is at the center of the plurality of moving blade teeth 36. FIGS. 2-4 show various orientations of the bladeset 10 and illustrate the respective relationship between the moving blade 32 and the stationary blade 18.

Figure 6A:
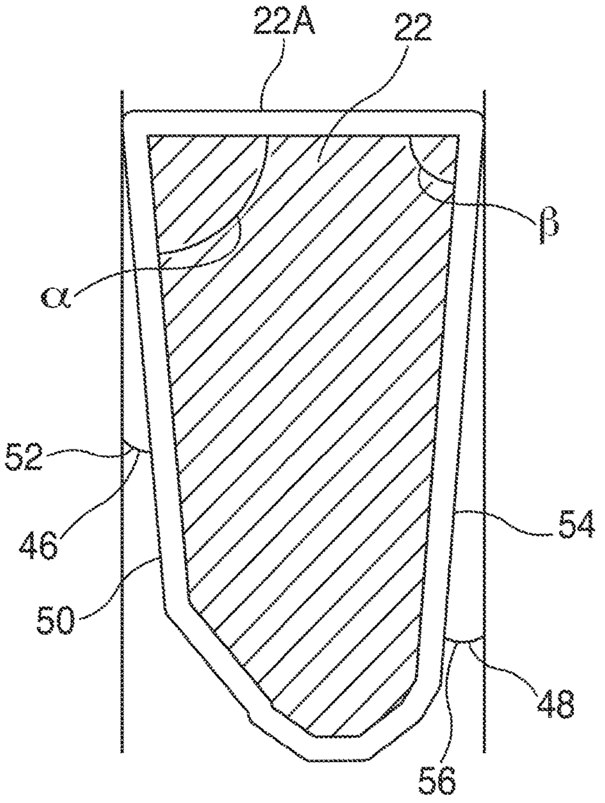
FIG. 6A is an enlarged section view of a single tooth from a stationary blade from the bladeset of FIG. 5.

Referring now to FIG. 6A, the stationary blade tooth 22, has a first rake angle 46, and a second rake angle 48. As is illustrated in FIG. 6A, the first rake angle 46 and the second rake angle 48 are defined as the angle between an edge of the stationary blade tooth 22 and a vertical line which is perpendicular to the stationary blade lateral axis 24.

Described differently, the first rake angle 46 and the second rake angle 48 are measured in relation to an internal angle of the associated stationary blade tooth 22. Specifically, each stationary blade tooth 22 has a horizontal base 22A, which is parallel to the stationary blade lateral axis 24. Further, the stationary blade tooth 22 has an interior edge 50 such that an angle $\alpha$ between the interior edge 50 and the stationary blade tooth base 22A is the complement to the first rake angle 46. Additionally, the stationary blade tooth 22 includes an exterior edge 54 that is opposite the stationary blade interior edge 50. In a similar manner, an angle $\beta$ between the stationary blade tooth base 22A and the stationary blade tooth exterior edge 54 is the complement to the second rake angle 48. In alternate embodiments, the first rake angle 46 is defined as a stationary blade teeth interior rake angle 52 and the second rake angle 48 is defined as a stationary blade teeth exterior rake angle 58.

Figure 6B:
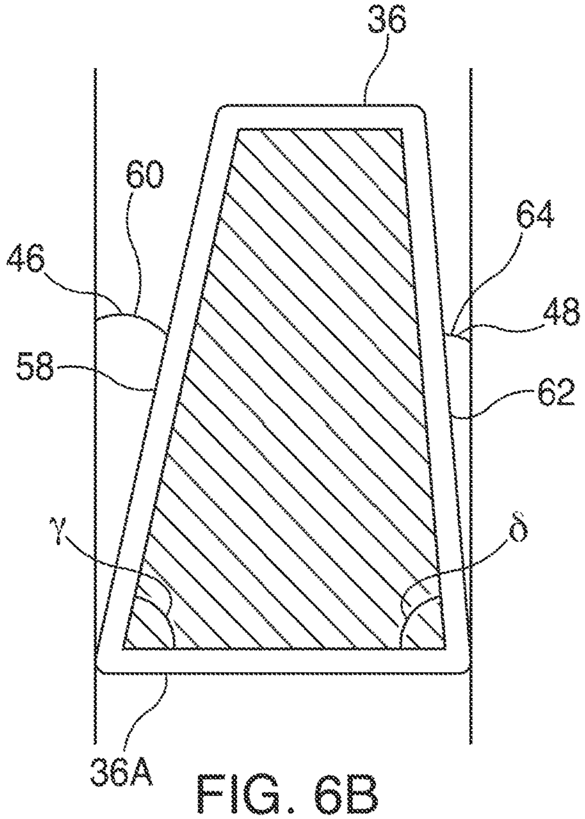
FIG. 6B is an enlarged section view of a single tooth from the moving blade from the bladeset of FIG. 5.

Likewise, FIG. 6B shows the moving blade tooth 36 with moving blade tooth base 36A which includes the first rake angle 46 and the second rake angle 48. The first rake angle 46 and second rake angle 48 are defined in the same manner for the moving blade tooth 36 as the stationary blade tooth 22. Accordingly, the moving blade tooth 36 includes an interior edge 58 and an exterior edge 62, such that the first rake angle 46 is the complement of an angle $\gamma$ between the interior edge 58 and the moving blade tooth base 36A. Similarly, the second rake angle 48 is the complement an angle $\delta$ between the exterior edge 62 and the moving blade tooth base 36A. In alternate embodiments, the first rake angle 46 is defined as a moving blade teeth interior rake angle 60 and the second rake angle 48 is defined as a moving blade teeth exterior rake angle 64.

The rake angle of the clipper blade teeth 22, 36 dictates the sharpness of the respective tooth. Specifically, when an edge of a tooth has a relatively large rake angle, that tooth edge will generally be sharper than a corresponding tooth with a smaller rake angle. In turn, a sharper tooth requires less tension force between the stationary blade 18 and the moving blade 32 to effectively cut hair. Accordingly, including stationary blade teeth 22 that have variable rake angles along the length of the stationary blade lateral axis 24 allows the hair clipper 12 with the bladeset 10 to compensate for a lack of tension between the moving blade 32 and the stationary blade 18 for the teeth located farther away from the source of the tension between the stationary and moving blades 18, 32. Note also referring to FIG. 5, that on each of the stationary and moving blades, 18, 32, each plurality of teeth 22, 36 is configured so that the interior/exterior face of the tooth is reversed on each side of the blade midpoint 30, 44. Both the stationary blade teeth 22 and the moving blade teeth 36 are configured so that a sharper, interior edge faces the blade midpoint.

An important feature of the present bladeset 10 relates to the first rake angles 46, and the interior rake angle 52, 60 of the plurality of moving blade teeth 36 and stationary blade teeth 22. Specifically, in a preferred embodiment, the first rake angle 46, the stationary blade interior rake angle 52, and the moving blade interior rake angle 60 change gradually from the stationary and moving blade midpoints 30, 44 to the first and second outermost stationary and moving blade teeth 26, 28, 40, 42. In a further preferred embodiment, the gradual change is an increase in the first rake angles 46, the stationary blade interior rake angles 52, and the moving blade interior rake angles 60. Described differently, this embodiment is characterized by the first and second outermost blade teeth 26, 28, 40, 42 having greater first rake angles 46, stationary blade interior rake angles 52, and moving blade interior rake angles 60, than each of the remaining plurality of stationary moving blade teeth 22, 36, with the first rake angles 46, stationary blade interior rake angles 52, and the moving blade interior rake angles 60 gradually decreasing as the plurality of stationary and moving blade teeth 22, 36 approach their respective blade midpoints 32, 44. A similar feature is present in certain embodiments with respect to the second rake angles 48, the stationary blade exterior rake angles 56, and the moving blade exterior rake angles 64. In these embodiments, the second rake angles 48, the stationary blade exterior rake angles 56, and the moving blade exterior rake angles 64 gradually change between the outermost stationary and moving blade teeth 26, 28, 40, 42 and the respective blade midpoints 30, 44. Preferably, this gradual change is a decrease in the second rake angles 48, the stationary blade exterior rake angles 56, and the moving blade exterior rake angles 64. In other words, the preferred embodiment features second rake angles 48, the stationary blade exterior rake angles 56, and the moving blade exterior rake angles 64 which are respectively least at the outermost stationary and moving blade teeth 26, 28, 40, 42 and increase as the plurality of stationary and moving blade teeth 22, 36 approach their respective blade midpoints 32, 44. It is contemplated that instead, the second rake angles 48, the stationary blade exterior rake angles 56, and the moving blade exterior rake angles 64 remain constant for each of the plurality of stationary and moving blade teeth 22, 36.

Figure 7:
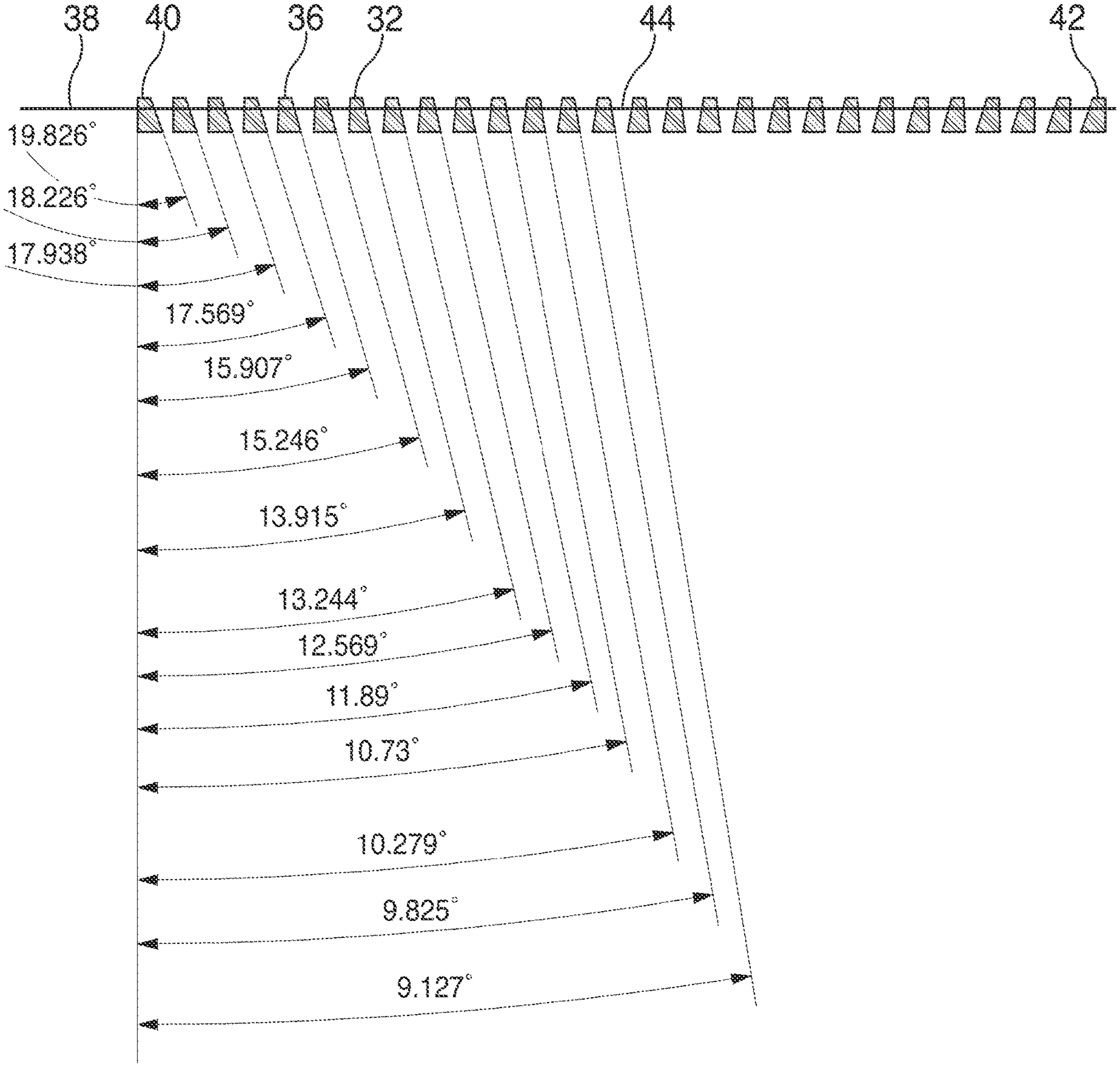
FIG. 7 is a cross-section of the moving blade taken along the line 5-5 of FIG. 3 with exemplary interior rake angles.
Figure 8:
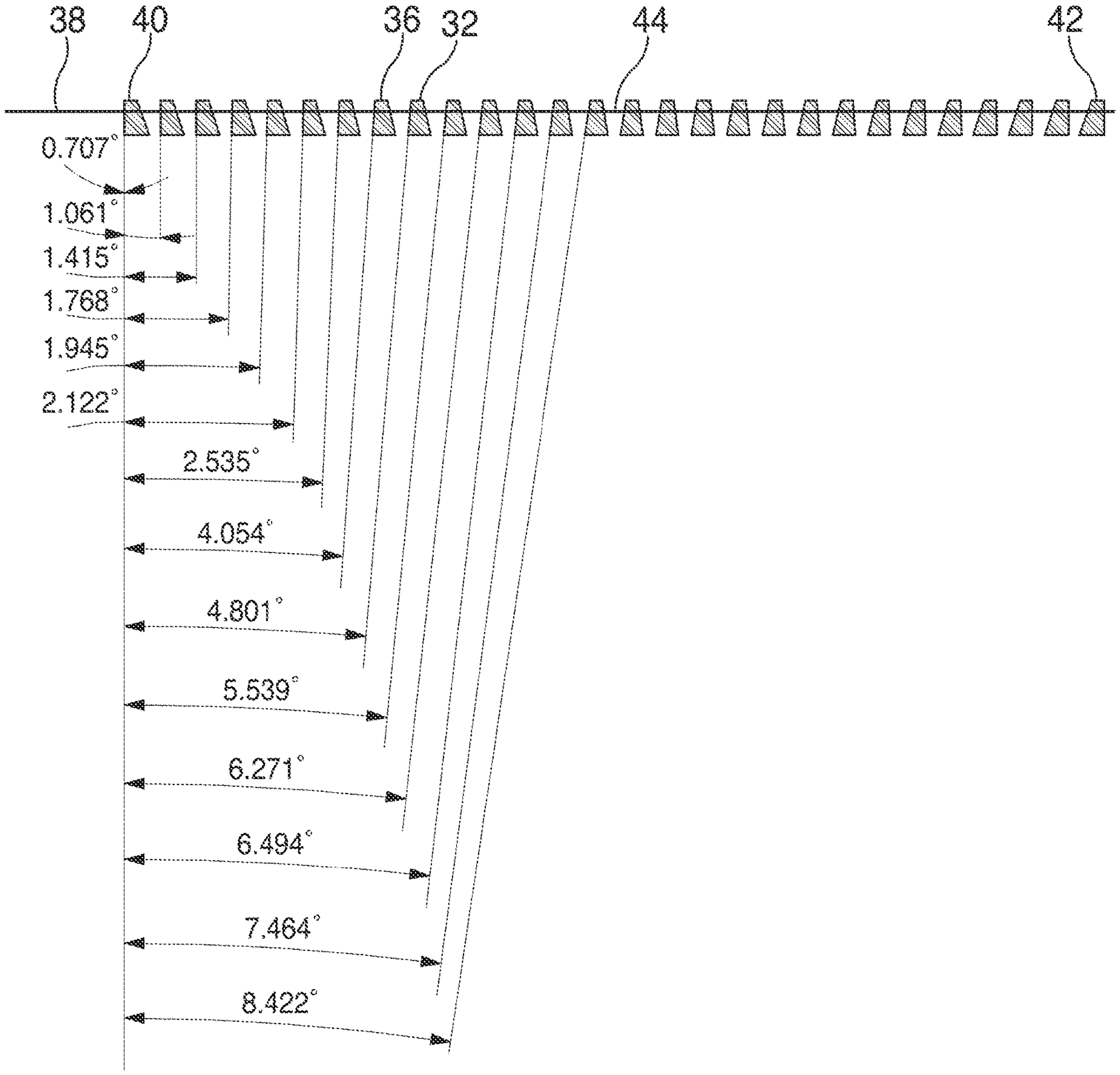
FIG. 8 is a cross-section of the moving blade taken along the line 5-5 of FIG. 3 with exemplary exterior rake angles.
Figure 9:
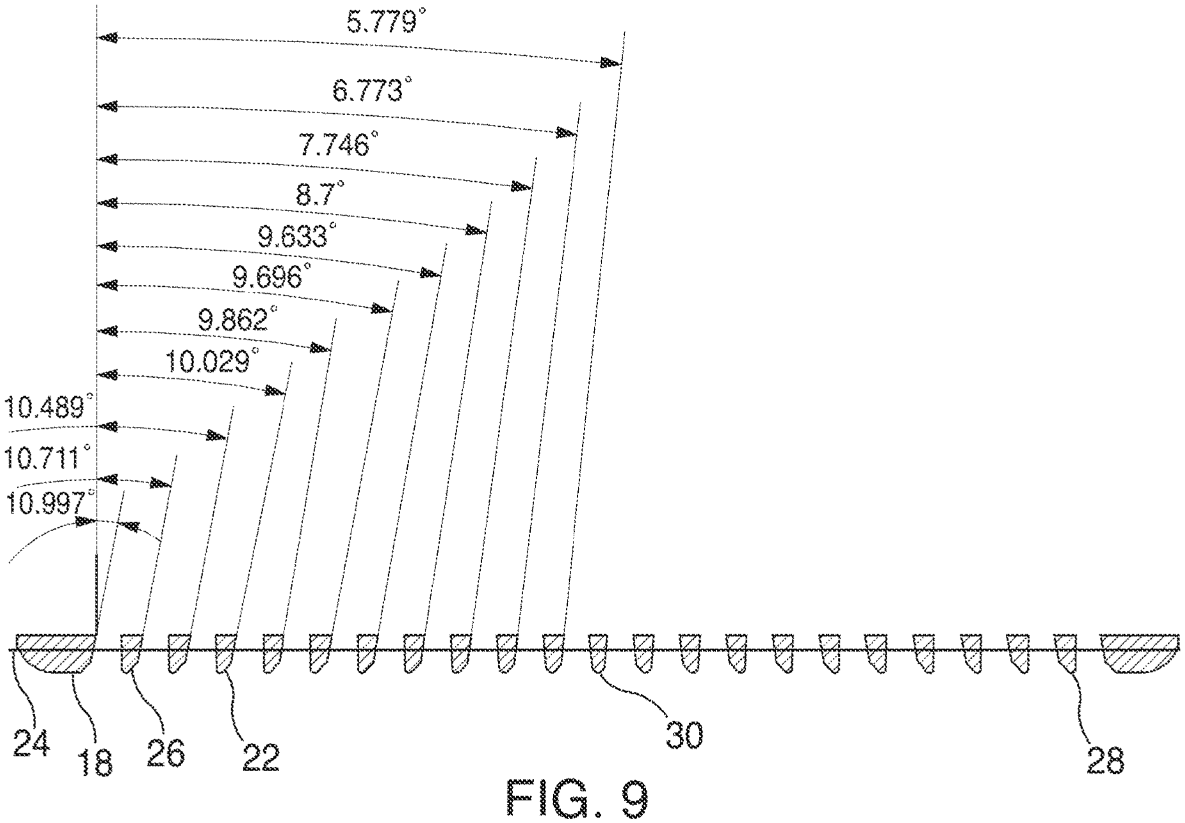
FIG. 9 is a cross-section of the stationary blade taken along the line 5-5 of FIG. 3 with exemplary interior rake angles.
Figure 10:
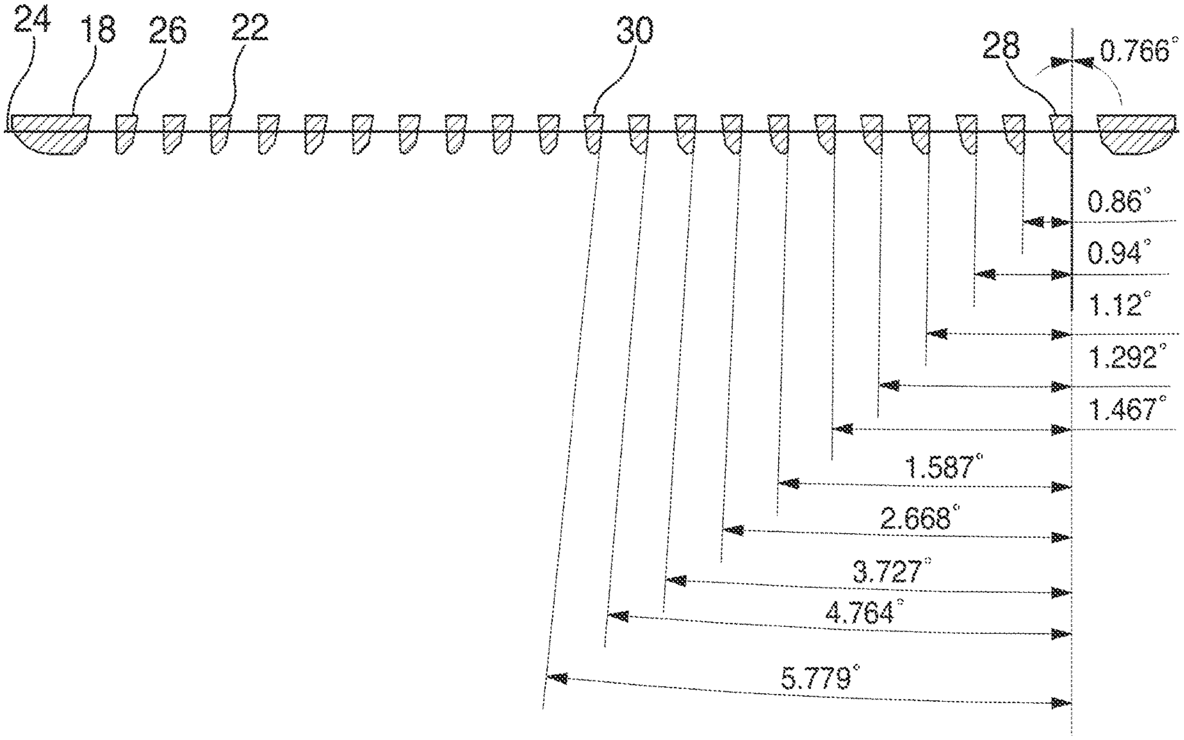
FIG. 10 is a cross-section of the stationary blade taken along the line 5-5 of FIG. 3 with exemplary exterior rake angles.

FIGS. 7 and 8 illustrate an exemplary plurality of moving blade teeth 36. Specifically, FIGS. 7 and 8 illustrate exemplary rake angles 46 and second rake angles 48 for a plurality of moving blade teeth 36. In particular, the first rake angle 46 optionally can vary between 0-30 degrees. Similarly, FIGS. 9 and 10 illustrate an exemplary plurality of stationary blade teeth 22. Specifically, FIGS. 9 and 10 illustrate exemplary first rake angles 46 and second rake angles 48 for a plurality of stationary blade teeth 22. Here as well, the first rake angle 46 optionally can vary between 0-30 degrees. While FIGS. 7-10 illustrate potential arrays of stationary and moving blade teeth 22, 36, and include possible first and second rake angles 46, 48, there are many potential combinations of first and second rake angles 46, 48 that could be used, and FIGS. 7-10 are understood only as illustration and do not limit the scope of the present disclosure.

Figure 5A:
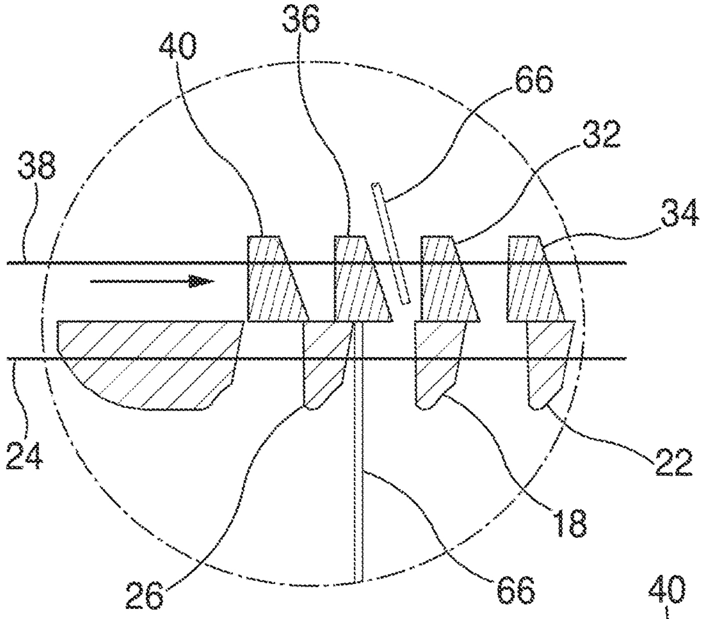
FIG. 5A is an enlarged view of the section from FIG. 5 illustrating the motion of a moving blade in the direction generally indicated.
Figure 5B:
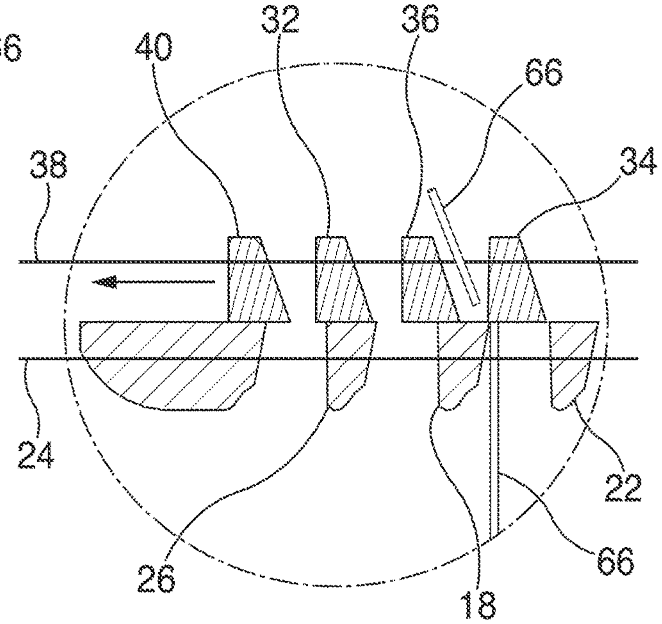
FIG. 5B is an enlarged view of the section from FIG. 5 illustrating the motion of the moving blade in the direction generally indicated.

Referring again to FIG. 5, the stationary blade lateral axis 24 and the moving blade lateral axis 38 run parallel to the direction of reciprocation between the stationary blade 18 and the moving blade 32. Moreover, FIGS. 5A and 5B show an enlarged view of the interaction between a few of the stationary and moving blade teeth 22, 36 and the resulting cutting action. Additionally, FIGS. 5A and 5B include a strand of hair 66 that is intended to demonstrate the operation of the bladeset 10. In particular, when the moving blade 32 is moving to the right with respect to the stationary blade 18 (as indicated by the arrow), the moving blade tooth 36 having an edge with the first rake angle 46 is cutting the strand of hair 66. As illustrated by FIG. 5B, when the moving blade 32 is moving to the left with respect to the stationary blade 18 (as indicated by the arrow), the strand of hair 66 is cut by the stationary blade tooth 22 having the sharper interior edge 50 and the rake angle While a particular embodiment of the present hair clipper bladeset with variable rake angle array tooth geometry and accompanying hair clipper has been described herein, it will be appreciated by those skilled in the art that changes and modifications may be made thereto without departing of the invention in its broader aspects and as set forth in the following claims.

The invention claimed is:

1. A bladeset for a hair clipper, comprising:

a stationary blade having a stationary blade body from which project a plurality of stationary blade teeth defined along a stationary blade lateral axis;

said plurality of stationary blade teeth including first and second outermost stationary blade teeth and a stationary blade midpoint being defined between said first and second outermost stationary blade teeth; and a moving blade having a moving blade body from which project a plurality of moving blade teeth defined along a moving blade lateral axis;

said plurality of moving blade teeth including first and second outermost moving blade teeth and a moving blade midpoint being defined between said first and second outermost moving blade teeth;

each of said stationary blade teeth and said moving blade teeth defining a rake angle along at least one edge of each said tooth;

said rake angles of at least one of said plurality of stationary blade teeth and said plurality of moving blade teeth changing gradually from said corresponding blade midpoint to said corresponding outermost tooth.

2. The bladeset of claim 1, wherein said rake angles of at least one of said plurality of stationary blade teeth and said plurality of moving blade teeth gradually increase from said corresponding blade midpoint to said corresponding outermost tooth.

3. The bladeset of claim 1, wherein said rake angles of both of said plurality of stationary blade teeth and said plurality of moving blade teeth gradually increase from said corresponding blade midpoint to said corresponding outermost tooth.

4. The bladeset of claim 2, wherein said rake angles range between 0-30 degrees.

5. The bladeset of claim 3, wherein said rake angles range between 0-30 degrees.

6. The bladeset of claim 1, wherein each of said plurality of stationary blade teeth and said plurality of moving blade teeth defining a second rake angle along a second edge of each said tooth, said second rake angles of at least one of said plurality of stationary blade teeth and said plurality of moving blade teeth changing gradually from said corresponding blade midpoint to said corresponding outermost tooth.

7. The bladeset of claim 6, wherein said second rake angles of at least one of said plurality of stationary blade teeth and said plurality of moving blade teeth gradually decrease from said corresponding blade midpoint to said corresponding outermost tooth.

8. The bladeset of claim 1, wherein each of said plurality of stationary blade teeth and said plurality of moving blade teeth defining a second rake angle along a second edge of each said tooth, said second rake angles of at least one of said plurality of stationary blade teeth and said plurality of moving blade teeth remaining constant from said corresponding blade midpoint to said corresponding outermost tooth.

9. A bladeset for a hair clipper, comprising:

a stationary blade having a stationary blade body from which project a plurality of stationary blade teeth defined along a stationary blade lateral axis;

said plurality of stationary blade teeth including first and second outermost stationary blade teeth;

the stationary blade lateral axis including a blade midpoint located between said outermost stationary blade teeth, said stationary blade teeth each including an interior edge having an interior rake angle, said stationary blade teeth interior rake angle changing gradually between the blade midpoint and said outermost stationary blade teeth; and a moving blade having a moving blade body from which project a plurality of moving blade teeth defined along a moving blade lateral axis and being configured for laterally reciprocating relative to said stationary blade for cutting hair therebetween;

said plurality of moving blade teeth including first and second outermost moving blade teeth;

the moving blade lateral axis including a blade midpoint located between said outermost moving blade teeth, said plurality of moving blade teeth including an interior edge having an interior rake angle, said plurality of moving blade teeth interior rake angle changing gradually between the blade midpoint and said outermost stationary blade teeth.

10. The bladeset of claim 9, wherein said stationary blade teeth interior rake angle of said plurality of stationary blade teeth gradually increases between the blade midpoint and said outermost stationary blade teeth.

11. The bladeset of claim 9, wherein said plurality of moving blade teeth interior rake angle gradually increases between the blade midpoint and said outermost moving blade teeth.

12. The bladeset of claim 10, wherein said plurality of stationary blade teeth interior rake angle ranges between 0-30 degrees.

13. The bladeset of claim 11, wherein said plurality of moving blade teeth interior rake angle ranges between 0-30 degrees.

14. The bladeset of claim 9, wherein each of said stationary blade teeth of said plurality of stationary blade teeth and each said moving blade teeth of said plurality of moving blade teeth defining an exterior rake angle along an exterior edge opposite said interior edge, said exterior rake angles of at least one of said plurality of stationary blade teeth and said plurality of moving blade teeth changing gradually from said corresponding blade midpoint to said corresponding outermost tooth.

15. The bladeset of claim 14, wherein said exterior rake angles of at least one of said plurality of stationary blade teeth and said plurality of moving blade teeth gradually decrease from said corresponding blade midpoint to said corresponding outermost tooth.

16. The bladeset of claim 9, wherein each of said plurality of stationary blade teeth and said plurality of moving blade teeth defining an exterior rake angle along an exterior edge opposite said interior edge, said exterior rake angles of at least one of said plurality of stationary blade teeth and said plurality of moving blade teeth remaining constant from said corresponding blade midpoint to said corresponding outermost tooth.

17. A hair clipper, comprising:

a base structural housing with a bladeset operably secured thereto, said bladeset comprising:

a stationary blade having a stationary blade body from which project a plurality of stationary blade teeth defined along a stationary blade lateral axis;

said plurality of stationary blade teeth including first and second outermost stationary blade teeth and a stationary blade midpoint being defined between said first and second outermost stationary blade teeth; and a moving blade having a moving blade body from which project a plurality of moving blade teeth defined along a moving blade lateral axis;

said plurality of moving blade teeth including first and second outermost moving blade teeth and a moving blade midpoint being defined between said first and second outermost moving blade teeth;

each of said plurality of stationary blade teeth and said plurality of moving blade teeth defining a rake angle along at least one edge of each said tooth;

said rake angles of at least one of said plurality of stationary blade teeth and said plurality of moving blade teeth changing gradually from said corresponding blade midpoint to said corresponding outermost tooth.

18. The hair clipper of claim 17, wherein said rake angles of at least one of said plurality of stationary blade teeth and said plurality of moving blade teeth gradually increase from said corresponding blade midpoint to said corresponding outermost tooth.

19. The hair clipper of claim 17, wherein said rake angles of both of said plurality of stationary blade teeth and said plurality of moving blade teeth gradually increase from said corresponding blade midpoint to said corresponding outermost tooth.

* * * * *